US012748601B2

(12) United States Patent
Tu et al.

(10) Patent No.: US 12,748,601 B2
(45) Date of Patent: Sep. 29, 2026

(54) DATA EXCHANGING METHOD OF PIPELINE ELEMENTS AND NON-TRANSITORY COMPUTER READABLE MEDIUM

(71) Applicant: ADLINK TECHNOLOGY INC., Taoyuan City (TW)

(72) Inventors: Chien-Hsun Tu, Taoyuan City (TW); Chien-Chung Lin, Taoyuan City (TW); Ming-Chang Kao, Taoyuan City (TW)

(73) Assignee: ADLINK TECHNOLOGY INC., Taoyuan City (TW)

( * ) Notice: Subject to any disclaimer, the term of this patent is extended or adjusted under 35 U.S.C. 154(b) by 329 days.

(21) Appl. No.: 18/398,805

(22) Filed: Dec. 28, 2023

(65) Prior Publication Data

US 2025/0156191 A1 May 15, 2025

(30) Foreign Application Priority Data

Nov. 10, 2023 (TW) ................................ 112143367

(51) Int. Cl.
*G06F 9/38* (2018.01)

(52) U.S. Cl.
CPC .................................. *G06F 9/3869* (2013.01)

(58) Field of Classification Search
CPC ....... G06F 9/3867; G06F 9/3869; G06T 1/00; G06T 5/00; G06T 7/00; H04N 19/00
See application file for complete search history.

(56) References Cited

U.S. PATENT DOCUMENTS

| | | | | |
|---|---|---|---|---|
| 7,595,805 | B2 * | 9/2009 | Molloy | G06T 1/60 345/545 |
| 10,915,731 | B2 * | 2/2021 | Mccormac | G06V 20/64 |
| 2010/0195279 | A1 * | 8/2010 | Michael | G06F 1/1632 361/679.41 |
| 2019/0228340 | A1 * | 7/2019 | Nicol | G06F 9/345 |
| 2020/0234065 | A1 * | 7/2020 | Shashua | B60R 11/04 |

FOREIGN PATENT DOCUMENTS

| | | | | | |
|---|---|---|---|---|---|
| CN | 107506329 | B | | 6/2018 | |
| CN | 113781519 | A | * | 12/2021 | G06N 3/045 |
| CN | 111008042 | B | * | 7/2022 | G06F 9/3869 |
| CN | 115525399 | A | | 12/2022 | |
| JP | 2005322224 | A | * | 11/2005 | G06T 15/005 |
| TW | I700637 | | | 8/2020 | |
| TW | I770448 | B | * | 7/2022 | G06T 1/20 |

OTHER PUBLICATIONS

TW Office Action dated Sep. 6, 2024 in application 112143367.

* cited by examiner

*Primary Examiner* — Stephen R Koziol
*Assistant Examiner* — Benedict E Lee
(74) *Attorney, Agent, or Firm* — Maschoff Brennan

(57) ABSTRACT

A data exchanging method of pipeline elements is adapted to process a pipeline of a data stream, and includes: processing, by a generic element in the pipeline, first raw data in the data stream to generate first analysis data; receiving and processing, by a first docking element, the first analysis data to generate the; and receiving, by the generic element, data associated with first feedback data and processing, by the generic element, second raw data in the data stream according to the data associated with first feedback data.

20 Claims, 16 Drawing Sheets

DATA EXCHANGING METHOD OF PIPELINE ELEMENTS AND NON-TRANSITORY COMPUTER READABLE MEDIUM

CROSS-REFERENCE TO RELATED APPLICATIONS

This non-provisional application claims priority under 35 U.S.C. § 119(a) on Patent Application No(s). 112143367 filed in Republic of China (ROC) on Nov. 10, 2023, the entire contents of which are hereby incorporated by reference.

BACKGROUND

1. Technical Field

This disclosure relates to a data exchanging method of pipeline elements and non-transitory computer readable medium.

2. Related Art

It is a common and convenient development method to build applications using a pipeline-based multimedia framework, where unique functions (for example, image capturing, encoding, decoding) may be built into a single element. Because elements are interchangeable and may be quickly combined, data exchange may be easily achieved.

However, once the pipeline is executed, it is difficult to obtain internal information during the process, resulting in low reusability of data stream. Furthermore, due to the framework of the pipeline, the pipeline needs to be restarted when an associated parameter needs to be revised when the pipeline is still running.

SUMMARY

Accordingly, this disclosure provides a data exchanging method of pipeline elements and non-transitory computer readable medium.

According to one or more embodiment of this disclosure, a data exchanging method of pipeline elements, adapted to a pipeline processing a data stream, includes: processing, by a generic element in the pipeline, first raw data in the data stream to generate first analysis data; receiving and processing, by a first docking element, the first analysis data to generate first feedback data; and receiving, by the generic element, data associated with the first feedback data and processing, by the generic element, second raw data in the data stream according to the data associated with the first feedback data.

According to one or more embodiment of this disclosure, a non-transitory computer readable medium stores one or more computer-executable instructions which when executed by a computer result in performing the data exchanging method of pipeline elements described above.

In view of the above description, the data exchanging method of pipeline elements and non-transitory computer readable medium according to one or more embodiments of the present disclosure may allow elements in a pipeline to perform data exchange dynamically, data in a data stream may have high reusability, and associated parameter may be adjusted online without restarting the pipeline. With a docking element, other data processing may be simultaneously performed, and another pipeline may also be executed in the docking element. Therefore, the pipeline may have wider applications.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

It should be noted that the pipeline element described herein may be used for pipeline-based multimedia framework (for example, GStreamer) on the basis of pipeline. The element may be a module with functions such as image capturing, coding, decoding, image processing, performing algorithm, inference and data storage etc. The data transmission between pipeline elements may be performed through probe callback, system map memory with event callback, or other communication or inter-process communication (IPC) protocol. In addition, data type processed by pipeline element may include inference data of artificial intelligence (AI), data log and monitor, result of scheduling guard or control of pipeline state etc. Said scheduling guard may be determining whether element status and information on each pipeline meet corresponding standards by accessing the element. Said scheduling guard may also be detecting status and information of the generic element connected to the docking element described below. Accordingly, stability and correctness of the pipeline during operation may be ensured. Further, said scheduling may include period of performing the accessing, and the scheduling may be defined by user, the present disclosure is not limited thereto.

Figure 1:
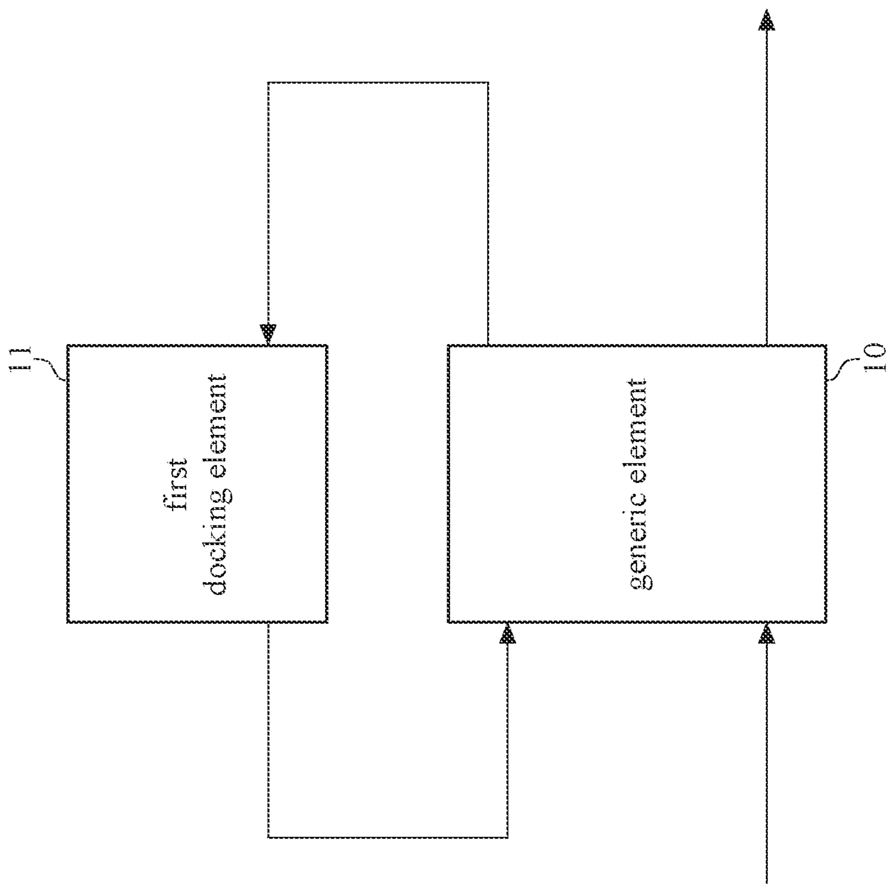
FIG. 1 is a schematic diagram illustrating pipeline elements and data exchanging method thereof according to an embodiment of the present application.

Please refer to FIG. 1, wherein FIG. 1 is a schematic diagram illustrating pipeline elements and data exchanging method thereof according to an embodiment of the present application. In FIG. 1, a pipeline includes a generic element 10 and a first docking element connected across both ends of the generic element 10. The generic element 10 and the first docking element 11 may be executed by a same processor, the generic element 10 and the first docking element 11 may also be executed by two processors, respectively, the present disclosure is not limited thereto. Said processor is, for example, a central processing unit, a graphics processing unit (GPU), a microcontroller, a programmable logic controller (PLC) or any other processor with computation function.

The generic element 10 is configured to process data in a data stream, and input the processed data into the first docking element 11. The first docking element 11 processes the processed data and feeds the processing result back to the generic element 10, for the generic element 10 to process next piece of data in the data stream accordingly. The source of the data stream may be a generation device of the data stream or an upstream element etc. and raw data may be at least one piece of data in the data stream or data output by the upstream element. For example, the generation device of the data stream may be a camera, wherein the data stream is a series of consecutive images, and raw data may be an image frame.

Figure 2:
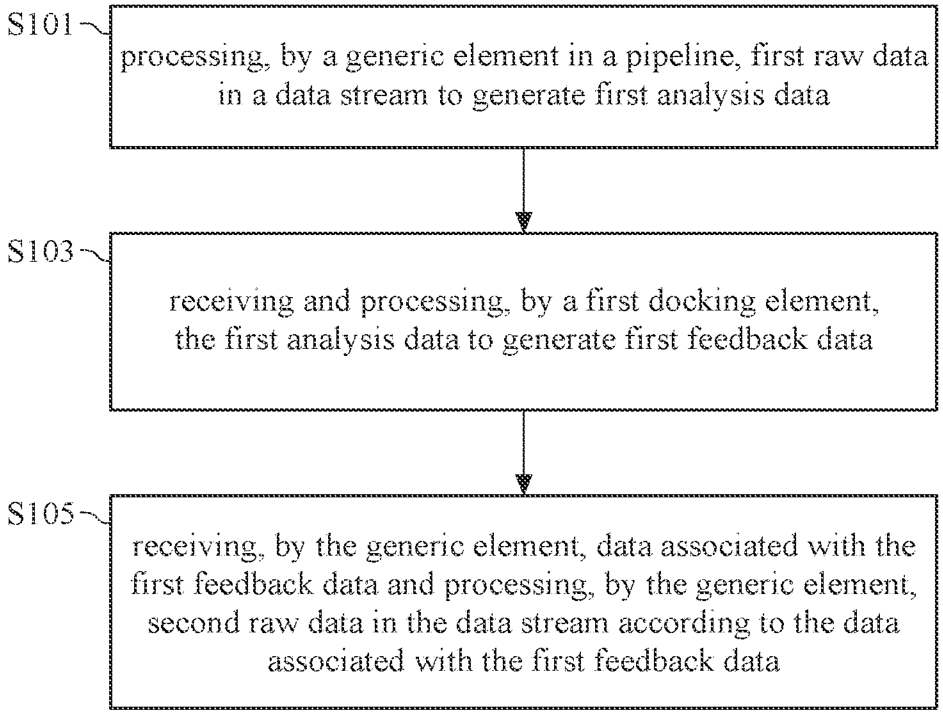
FIG. 2 is a flowchart illustrating a data exchanging method according to an embodiment of the present application.

To explain the above contents in more details, please refer to FIG. 1 and FIG. 2, wherein FIG. 2 is a flowchart illustrating a data exchanging method according to an embodiment of the present application. The data exchanging method of pipeline elements is adapted to process the pipeline of the data stream, and the method includes: step S101: processing, by a generic element in the pipeline, first raw data in the data stream to generate first analysis data; step S103: receiving and processing, by a first docking element, the first analysis data to generate first feedback data; and step S105: receiving, by the generic element, data associated with the first feedback data and processing, by the generic element, second raw data in the data stream according to the data associated with the first feedback data.

In step S101, the generic element 10 processes first raw data in the data stream to generate first analysis data. The generic element 10 may pre-store a first algorithm, and the generic element 10 processes the first raw data according to the first algorithm. For example, the data stream is a series of consecutive images, the raw data is an image frame, and the first algorithm is an object tracking algorithm. The first analysis data may include result of the object tracking algorithm.

In step S103, the first docking element 11 receives the first analysis data from the generic element 10 and processes the first analysis data to generate the first feedback data. The first analysis data may include result of processing the first analysis data. The first docking element 11 may pre-store a second algorithm, and the first docking element 11 processes the first analysis data according to the second algorithm. For example, the first analysis data is the result of object tracking, and the second algorithm is an optical flow algorithm. An implementation of step S103 may be the first docking element 11 receiving a user command, and processing the first analysis data according to the user command to generate the first feedback data. Take object tracking as an example, the user command may be external trajectory prediction result.

In step S105, the generic element 10 receives data associated with the first feedback data and processes second raw data in the data stream according to said data associated with the first feedback data. The implementation of step S105 may include the generic element 10 receiving the first feedback data directly from the first docking element 11. Continuing from the example of the object tracking algorithm and the optical flow algorithm described above, the generic element 10 may further analyze object movement in the second raw data according to the first feedback data, wherein said movement may be velocity, direction and/or acceleration etc. Further, the second analysis data generated by the generic element 10 processing the second raw data may be input to the first docking element 11, a user device (for example, a computer, a smart phone etc.), a data storage device and/or the next generic element. In addition, the implementation of step S105 may also include the generic element 10 receiving the data associated with the first feedback data from another element, wherein said data is generated by said another element processing the first feedback data.

By using a docking element to build data loopback, data in the pipeline may be easily reused without increasing the complexity of the pipeline. Therefore, operations of multimedia framework and artificial intelligence may be more efficient.

Figure 3:
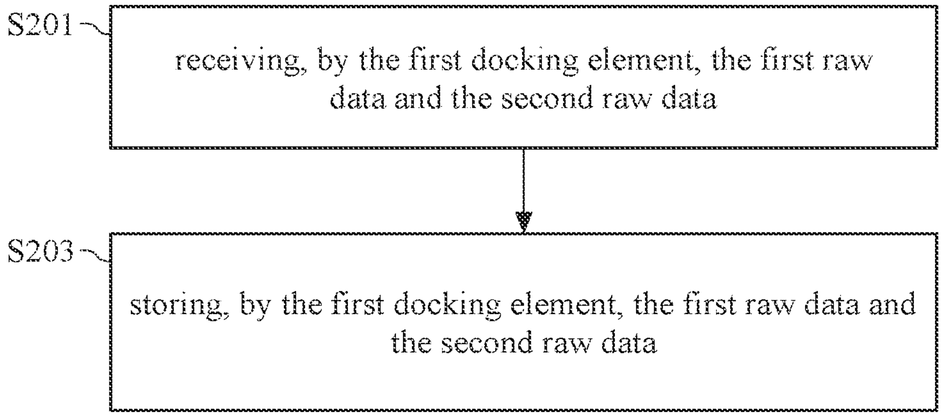
FIG. 3 is a flowchart illustrating a docking element processing data according to analysis results generated by a generic element.

Please refer to FIG. 1 and FIG. 3, wherein FIG. 3 is a flowchart illustrating a docking element processing data according to analysis results generated by a generic element. FIG. 3 may be regarded as a detailed flowchart of an embodiment of step S103 of FIG. 2, and includes: step S201: storing, by the first docking element, the first raw data and the second raw data; and step S203: processing, by the first docking element, the first raw data and the second raw data to generate the first feedback data.

In step S201, the first docking element 11 stores the first raw data and the second raw data, and the timing of the generation of the second raw data is later than the timing of the generation of the first raw data. In other words, after processing the first raw data, the generic element 10 may output the first raw data to the first docking element 11. In step S203, the first docking element 11 processes the first raw data and the second raw data to generate the first feedback data.

Continuing from the example of the optical flow algorithm described above, the first raw data and the second raw data are two consecutive image frames, the first docking element 11 performs the optical flow algorithm on the first raw data and the second raw data to generate a displacement vector of an object, and uses the displacement vector as the first feedback data output to the generic element 10.

Figure 4:
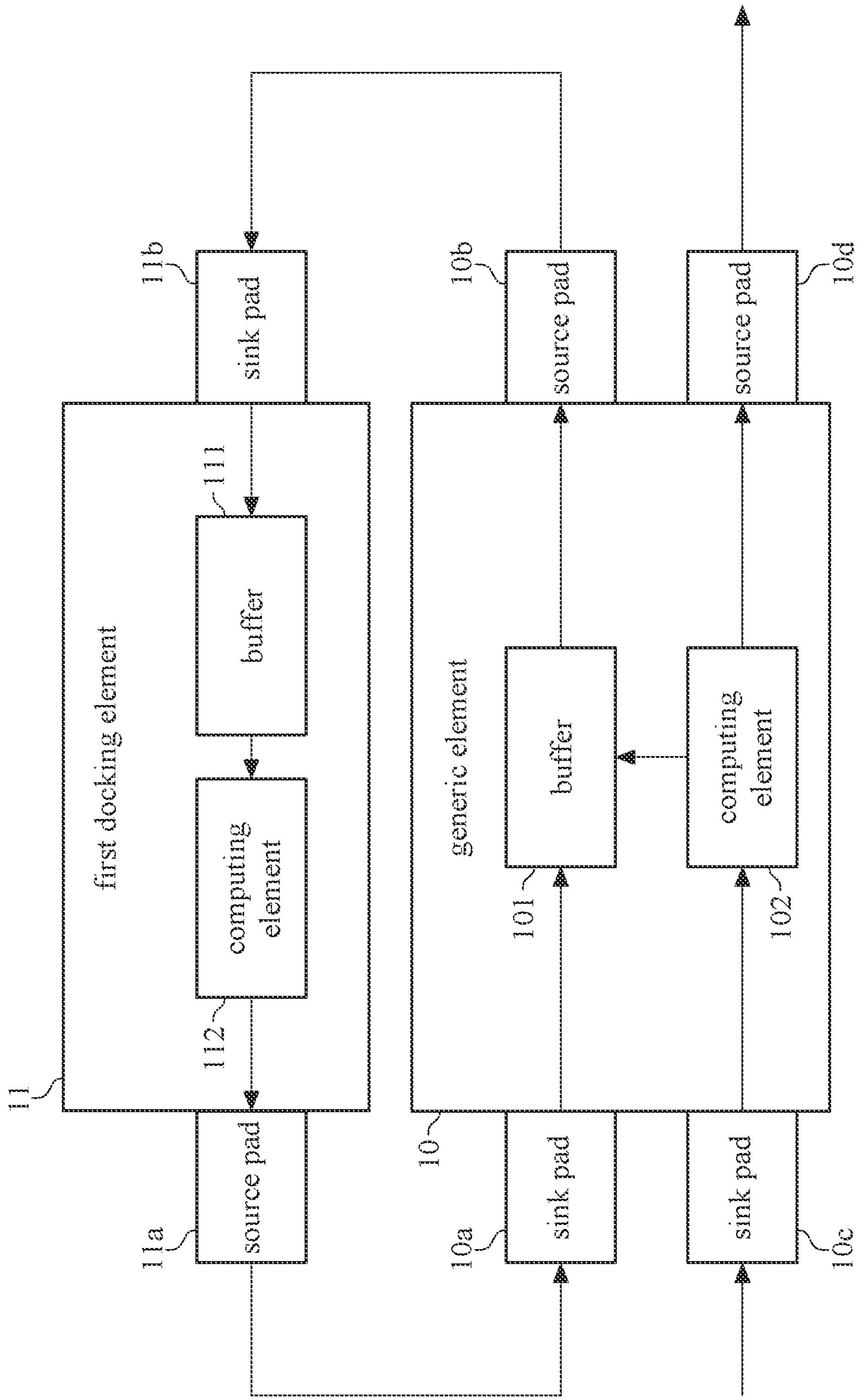
FIG. 4 is a detailed structure of pipeline elements according to an embodiment of the present application.

Please refer to FIG. 4, wherein FIG. 4 is a detailed structure of pipeline elements according to an embodiment of the present application. As shown in FIG. 4, the generic element 10 may include a buffer 101 and a computing element 102, and the buffer 101 is connected to the computing element 102. Similarly, the first docking element 11 may include a buffer 111 and a computing element 112, and the buffer 111 is connected to the computing element 112, wherein the computing element 112 may be connected to an application for presenting a user interface to obtain the user command described above. The buffer may be configured to store data, and the computing element may be configured to pre-store algorithms, process data stored in the buffer and control other elements, etc. Furthermore, the computing element may be a docking handler or a logic controller, the present disclosure is not limited thereto.

In addition, the data exchanging method of pipeline elements may further include: defining a sink pad 10*a* and a source pad 10*b* on the generic element 10; defining a source pad 11*a* and a sink pad 11*b* on the first docking element 11; and connecting the sink pad 10*a* of the generic element 10 to the source pad 11*a* of the first docking element 11 and connecting the source pad 10*b* of the generic element 10 to the sink pad 11*b* of the first docking element 11. In addition, the generic element 10 may be further provided with a sink pad 10*c* and a source pad 10*d*. The sink pad is configured to receive data, and the source pad is configured to output data. The number of the computing element, the buffer, the sink pad and the source pad of each element may be adjusted according to usage requirements, the number of the computing element, the buffer, the sink pad and the source pad of each element shown in FIG. 4 is merely an example, the present disclosure is not limited thereto.

If an element is connected to a docking element, then the buffer and the computing element of the element may be connected to the sink pad and the source pad of the element, respectively, as shown by the generic element 10 in FIG. 4. If an element is not connected to a docking element, then the buffer and the computing element of the element may be connected in series, and the buffer is connected to the sink pad, and the computing element is connected to the source pad, as shown by the first docking element 11 in FIG. 4.

Figure 5:
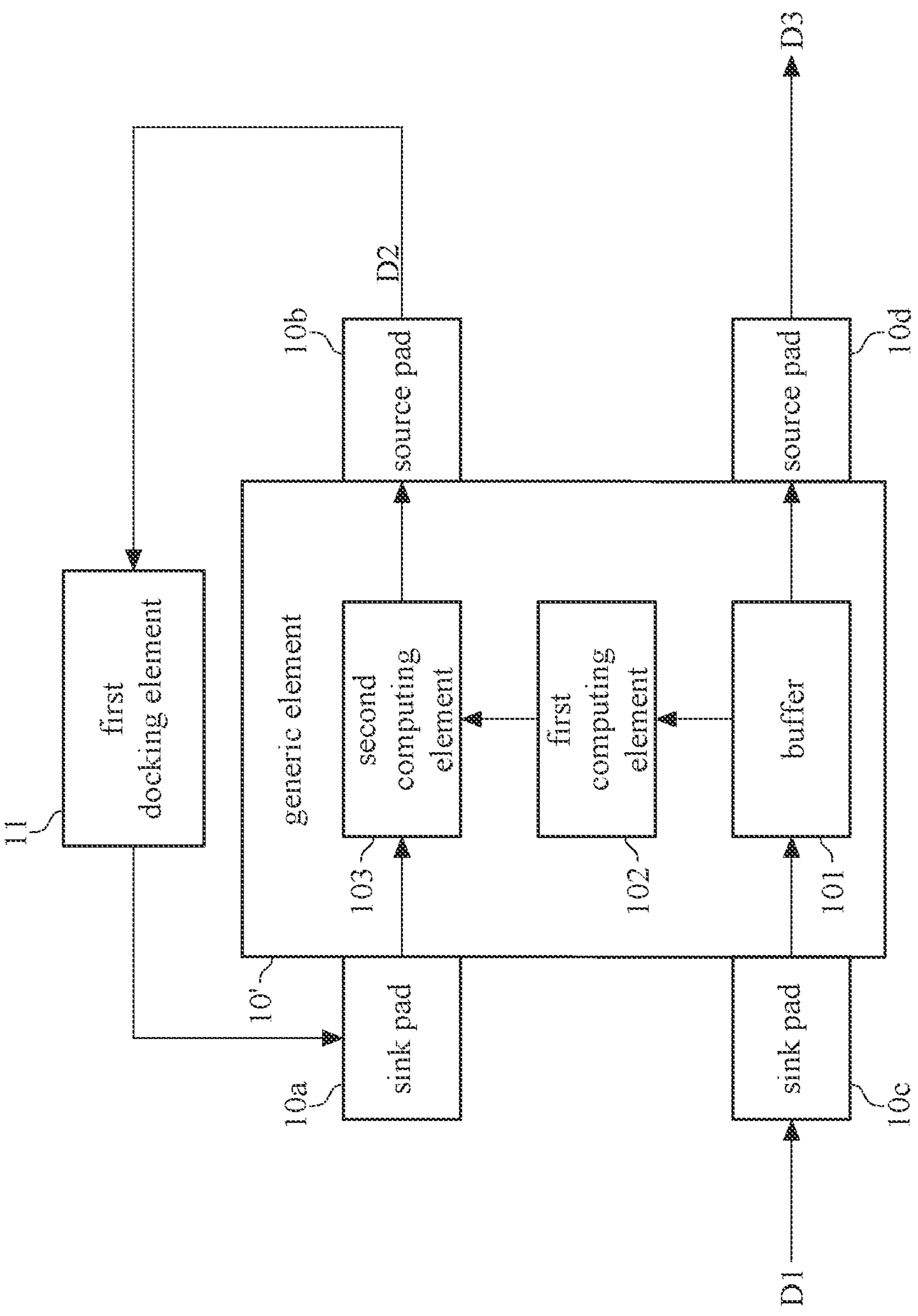
FIG. 5 is a schematic diagram illustrating an operation of the pipeline elements according to FIG. 4.

To explain the operation of the pipeline element in FIG. 4 in more detail, please refer to FIG. 4 and FIG. 5, wherein FIG. 5 is a schematic diagram illustrating an operation of the pipeline elements according to FIG. 4. It should be noted that the pipeline structure of FIG. 5 is similar to the pipeline structure of FIG. 4, the difference is that the generic element 10' in FIG. 5 includes two computing elements, which are a first computing element 102 and a second computing element 103. The first computing element 102 may be configured to process the raw data, and the second computing element 103 may be configured to determine which piece(s) of data should be sent to the first docking element 11. In FIG. 5, the data stream is a series of consecutive images, and the raw data is an image frame.

The generic element 10' receives the first raw data D1 through the sink pad 10*c*, and the buffer 101 stores the first raw data D1. The first computing element 102 performs the object tracking algorithm on the first raw data D1 to generate metadata (for example, an object frame). The second computing element 103 uses the metadata as the first analysis data D2 and outputs the first analysis data D2 to the first docking element 11 through the source pad 10*b*. The second computing element 103 may further outputs the first raw data D1 to the first docking element 11 through the source pad 10*b*. The first docking element 11 processes the first analysis data D2 to generate the first feedback data and outputs the first feedback data to the sink pad 10*a* of the generic element 10. At the same time, the source pad 10*d* of the generic element 10' may output another piece of raw data D3 to the downstream element of the generic element 10', wherein the raw data D3 is the data already processed by the generic element 10' and the first docking element 11. Further, after obtaining the first feedback data, the source pad 10*d* of the generic element 10' may output the metadata and/or the first raw data D1 to its the downstream element.

Figure 6:
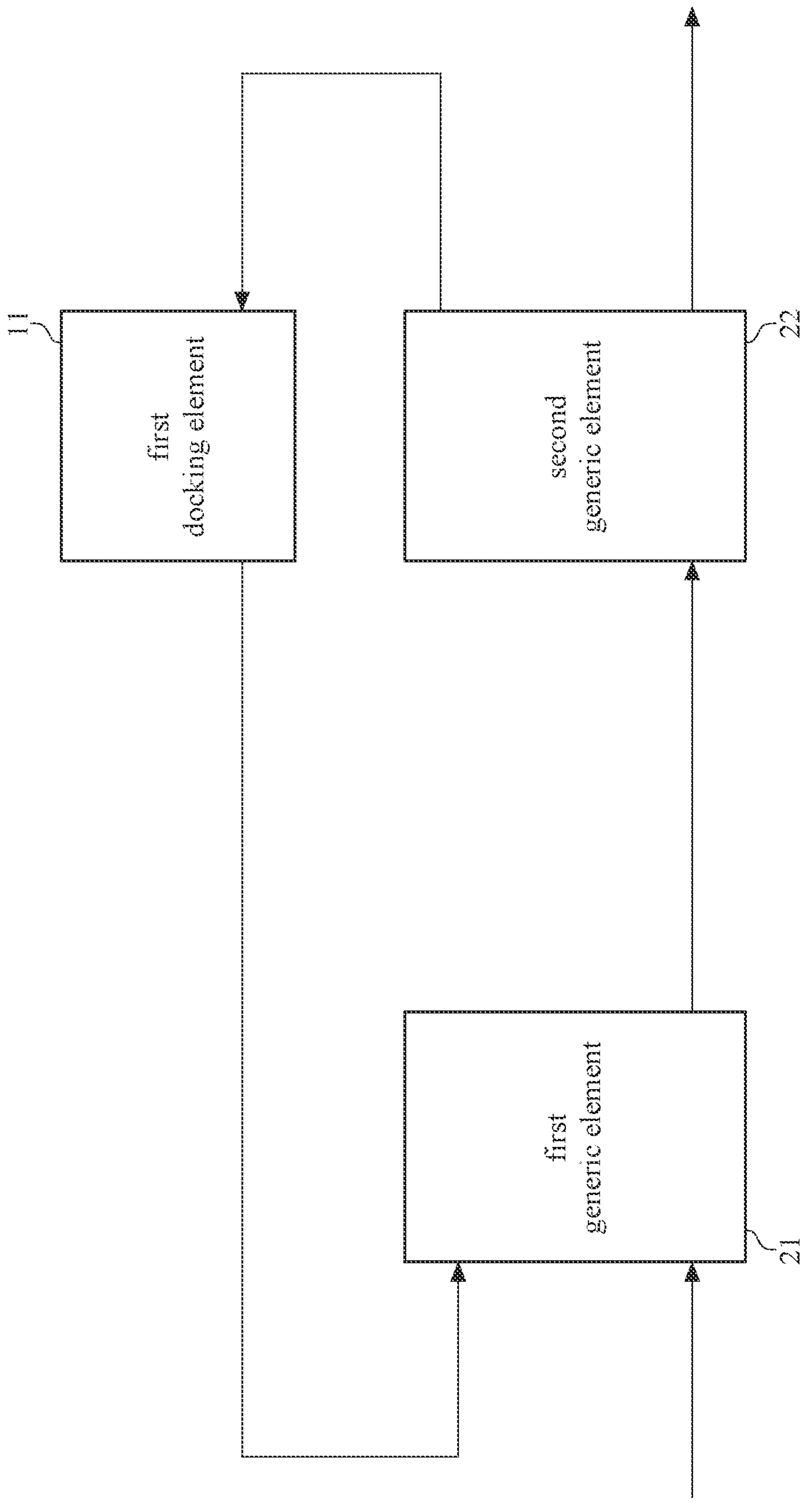
FIG. 6 is a schematic diagram illustrating pipeline elements and data exchanging method thereof according to another embodiment of the present application.

Please refer to FIG. 6, wherein FIG. 6 is a schematic diagram illustrating pipeline elements and data exchanging method thereof according to another embodiment of the present application. In FIG. 6, the pipeline includes a first generic element 21 and a second generic element 22, the first docking element 11 is connected across the first generic element 21 and the second generic element 22. The first docking element 11, the first generic element 21 and the second generic element 22 may be executed by a same processor, or by different processors, respectively, the present disclosure is not limited thereto. The first generic element 21 is connected to the second generic element 22. The implementation of the first generic element 21 and the second generic element 22 may be the same as the generic element 10 of FIG. 1, and the implementation of the first docking element 11 may be the same as the first docking element 11 of FIG. 1.

The first docking element 11 and the second generic element 22 are adapted to operations of FIG. 2 to FIG. 5, and the implementation of step S105 of FIG. 2 may include the second generic element 22 processing the second raw data according to intermediate data output by the first generic element 21, wherein the intermediate data is generated by the first generic element 21 processing the first feedback data. In other words, after the first docking element 11 receives the first analysis data from the second generic element 22 and outputs the first feedback data to the first generic element 21, the first generic element 21 processes the first feedback data to generate the intermediate data, and the second generic element 22 processes the second raw data according to the intermediate data.

For example, the first generic element 21 is configured to execute artificial intelligence inference engine, the second generic element 22 is configured to execute algorithm, and the first docking element 11 is a module connected to cloud. The first docking element 11 generates an inference result (i.e. the intermediate data) by performing inference, the second generic element 22 generates the algorithm result (i.e. the first analysis data) by executing algorithm on the inference result. If the first docking element 11 determines that the inference engine of the first docking element 11 is not suitable after processing the algorithm result, the first docking element 11 generates an engine replacement command and/or obtains a new inference engine (i.e. the first feedback data). Therefore, the first generic element 21 may update the inference engine accordingly.

In addition, same as the embodiment of FIG. 4, the first docking element 11, the first generic element 21 and the second generic element 22 may each be disposed with a computing element, a buffer, a sink pad and a source pad, and the number of the computing element, the buffer, the sink pad and the source pad may be adjusted according to usage requirement. The source pad of the first docking element 11 may be connected to the sink pad of any upstream element, and the first docking element 11 may transmit data to the upstream element and perform designated task on the upstream element. The data exchanging method of pipeline elements of the present disclosure may coordinate the cooperation of different elements to optimize data processing. Further, according to the structure of FIG. 6, the upstream element may perform designated task according to usage requirement, thereby improving efficiency of data processing and data transmission.

Figure 7:
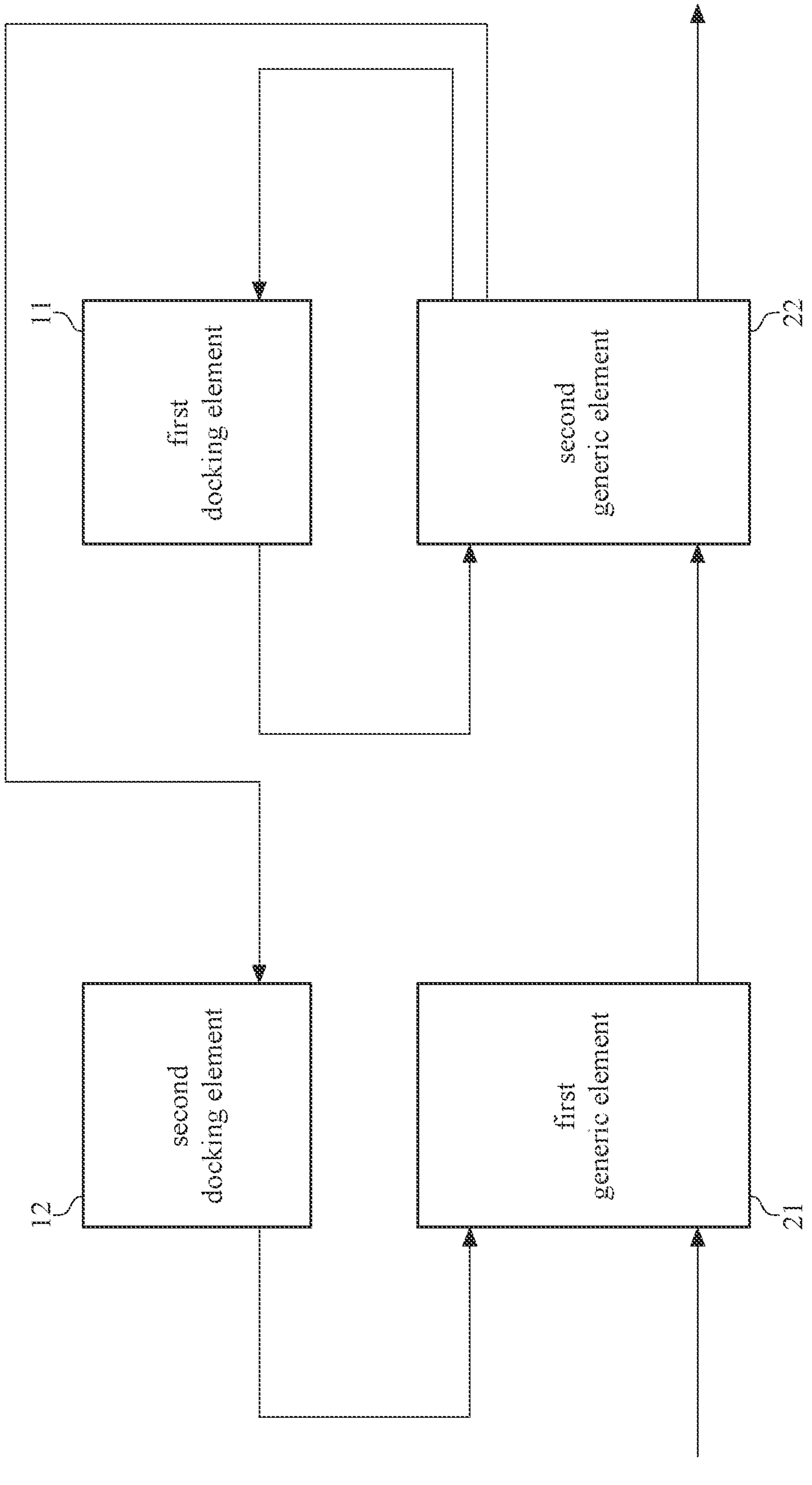
FIG. 7 is a schematic diagram illustrating pipeline elements and data exchanging method thereof according to yet another embodiment of the present application.

FIG. 7 is a schematic diagram illustrating pipeline elements and data exchanging method thereof according to yet another embodiment of the present application. In FIG. 7, the pipeline includes a first generic element 21 and a second generic element 22, the first docking element 11 is connected across the second generic element 22, the second docking element 12 is connected across the first generic element 21 and the second generic element 22. The first docking element 11, the second docking element 12, the first generic element 21 and the second generic element 22 may be executed by a same processor, or by different processors, respectively, the present disclosure is not limited thereto. The first generic element 21 is connected to the second generic element 22. The implementation of the first docking element 11, the first generic element 21 and the second generic element 22 may be the same as the first docking element 11, the first generic element 21 and the second generic element 22 of FIG. 6.

The second docking element 12 may receive the first analysis data from the second generic element 22 and process the first analysis data to generate second feedback data. The second docking element 12 may output the second feedback data to the first generic element 21, the second docking element 12 may also output the second feedback data to another pipeline or an external device.

Figure 8:
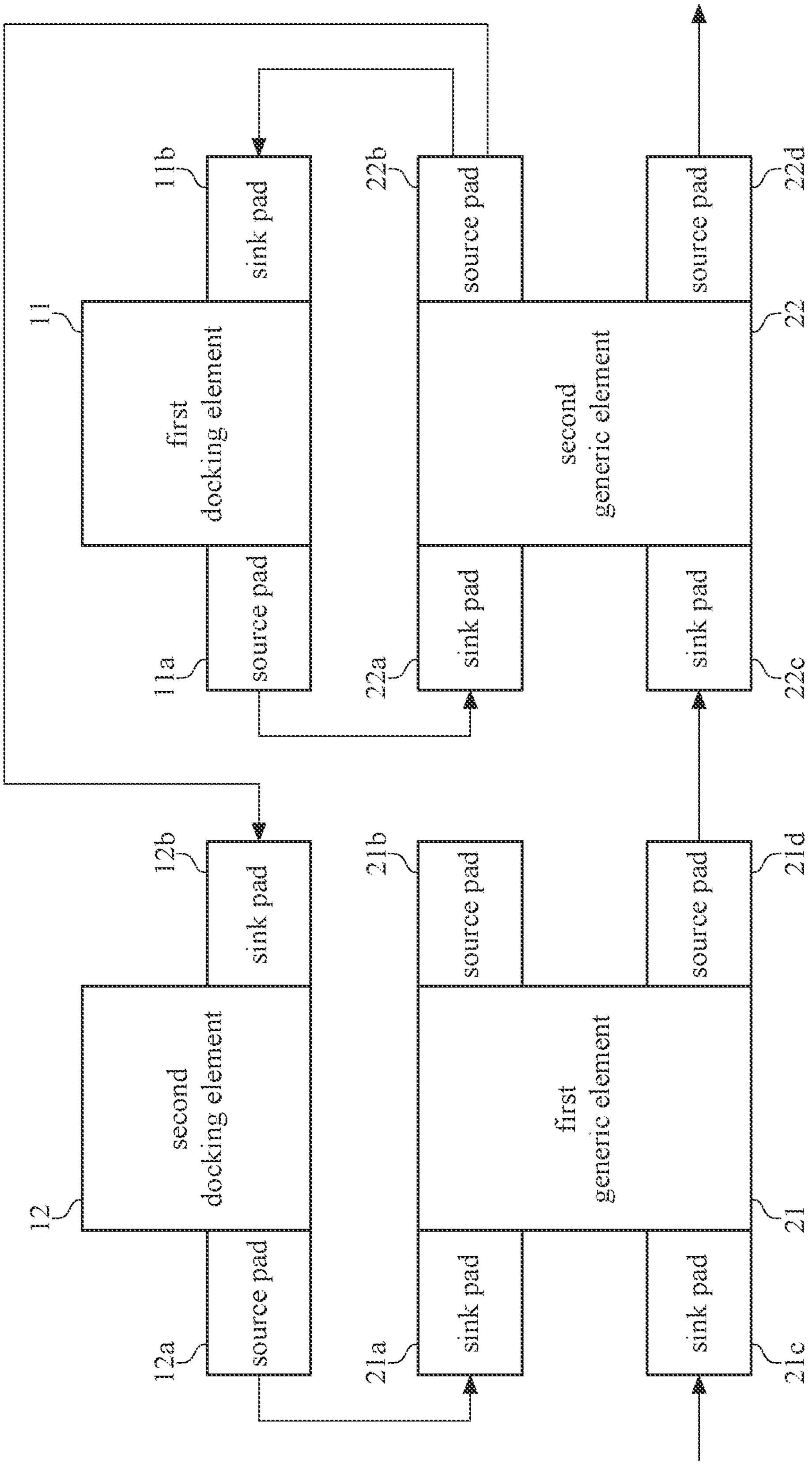
FIG. 8 is a detailed structure of pipeline elements according to another embodiment of the present application.
Figure 9A:
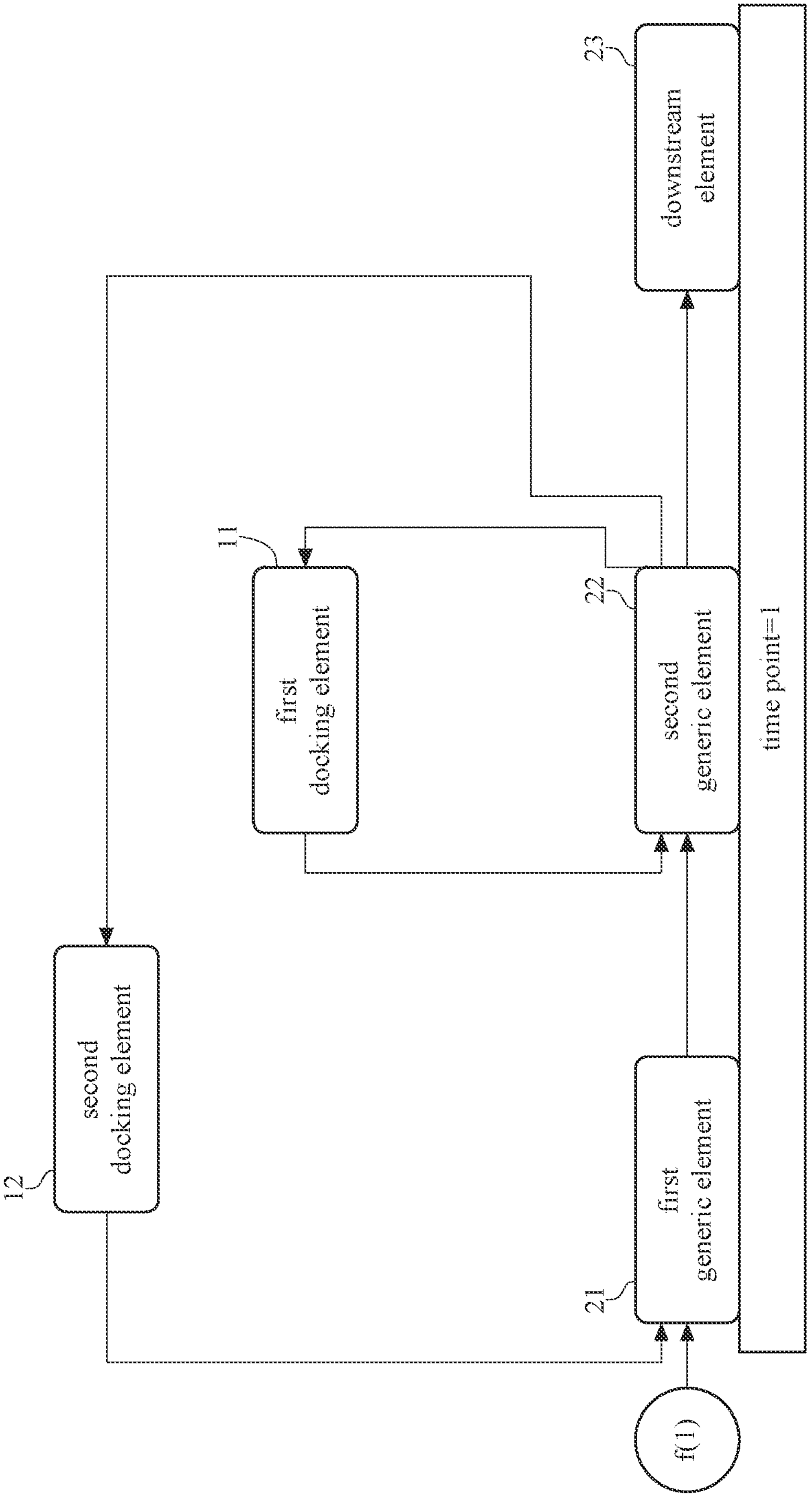
FIG. 9(*a*) to FIG. 9(*h*) are schematic diagrams illustrating operation of performing image analysis and camera control by using pipeline elements of FIG. 7.
Figure 9B:
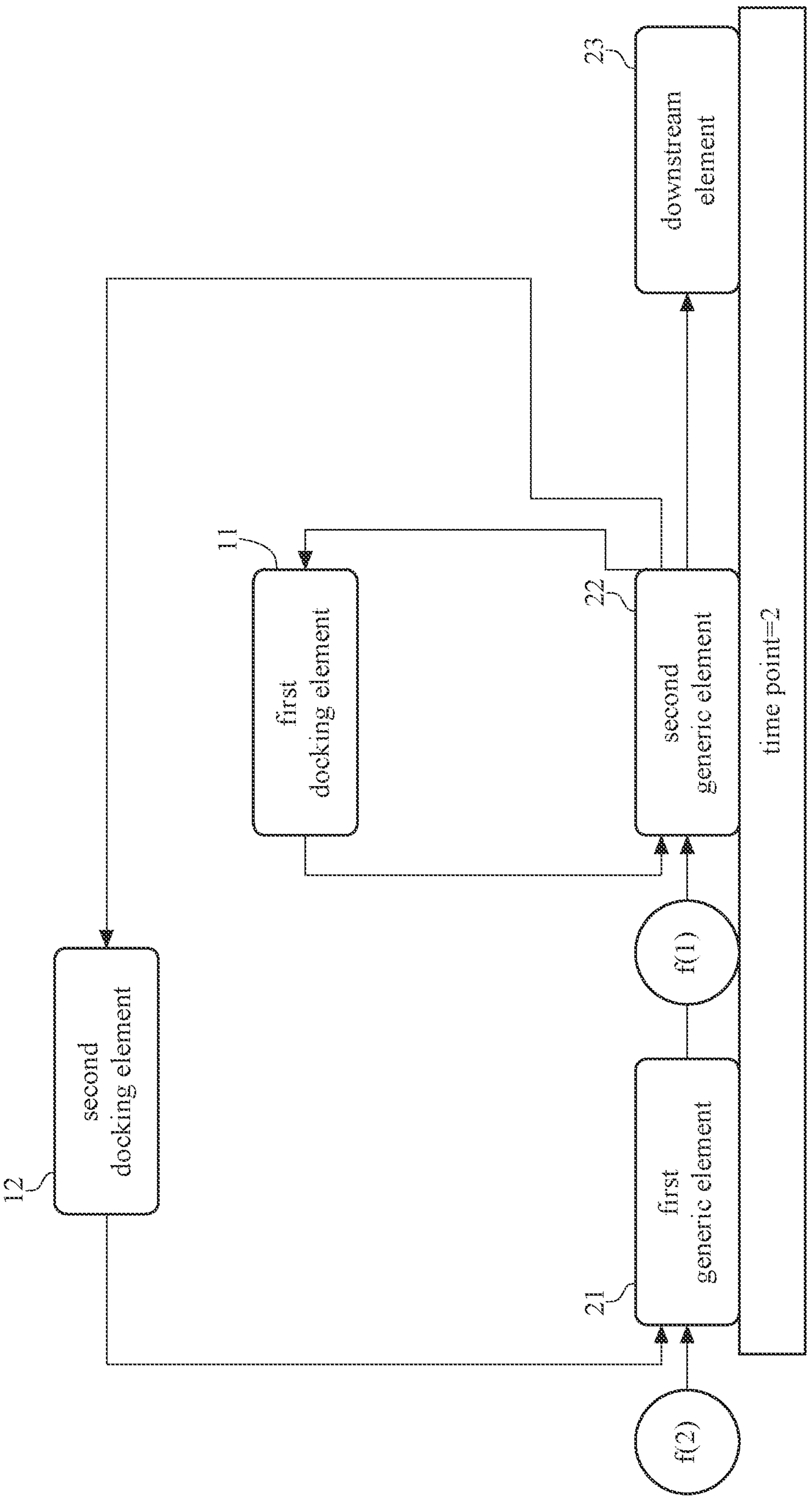
Figure 9C:
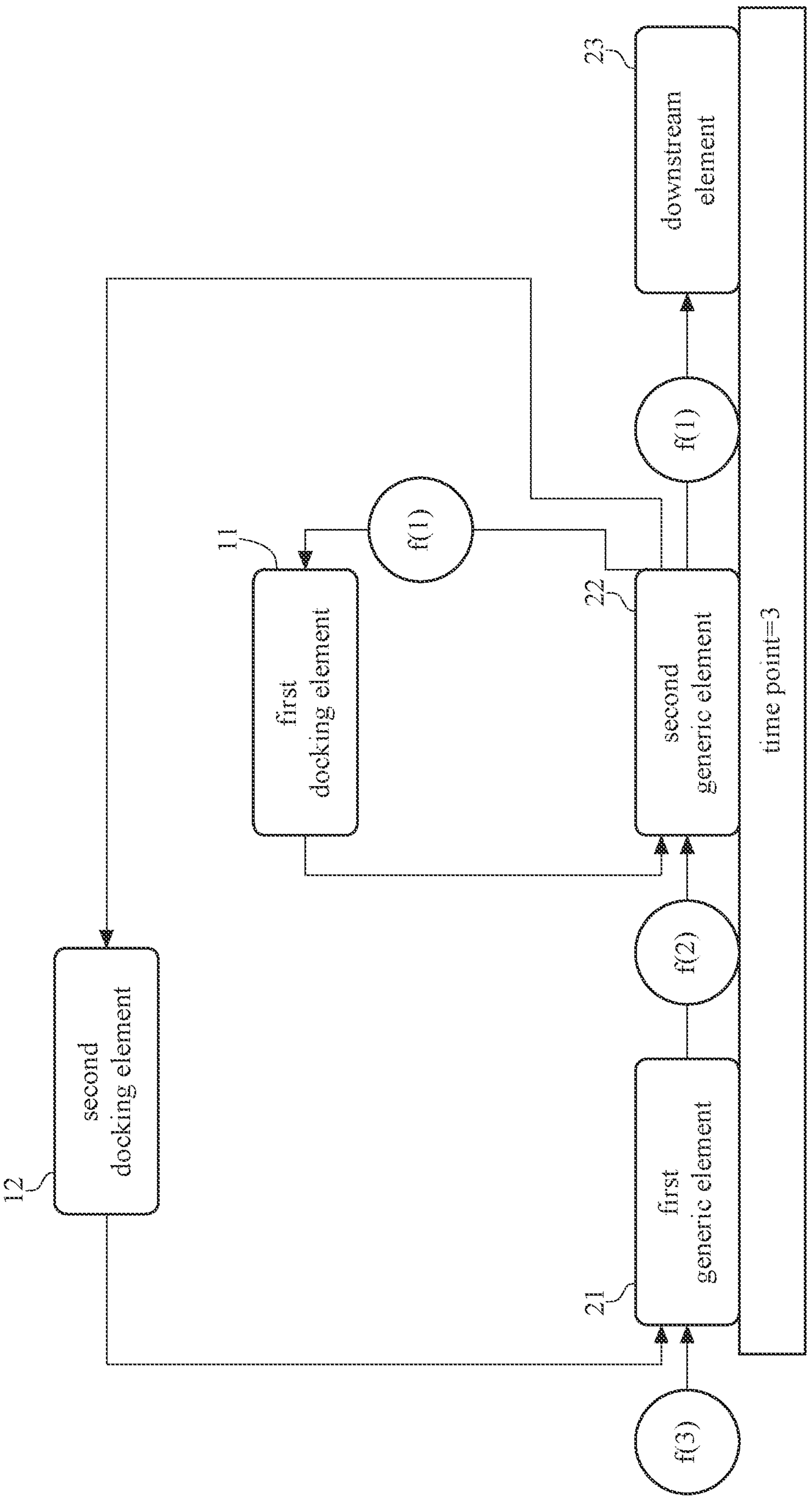
Figure 9D:
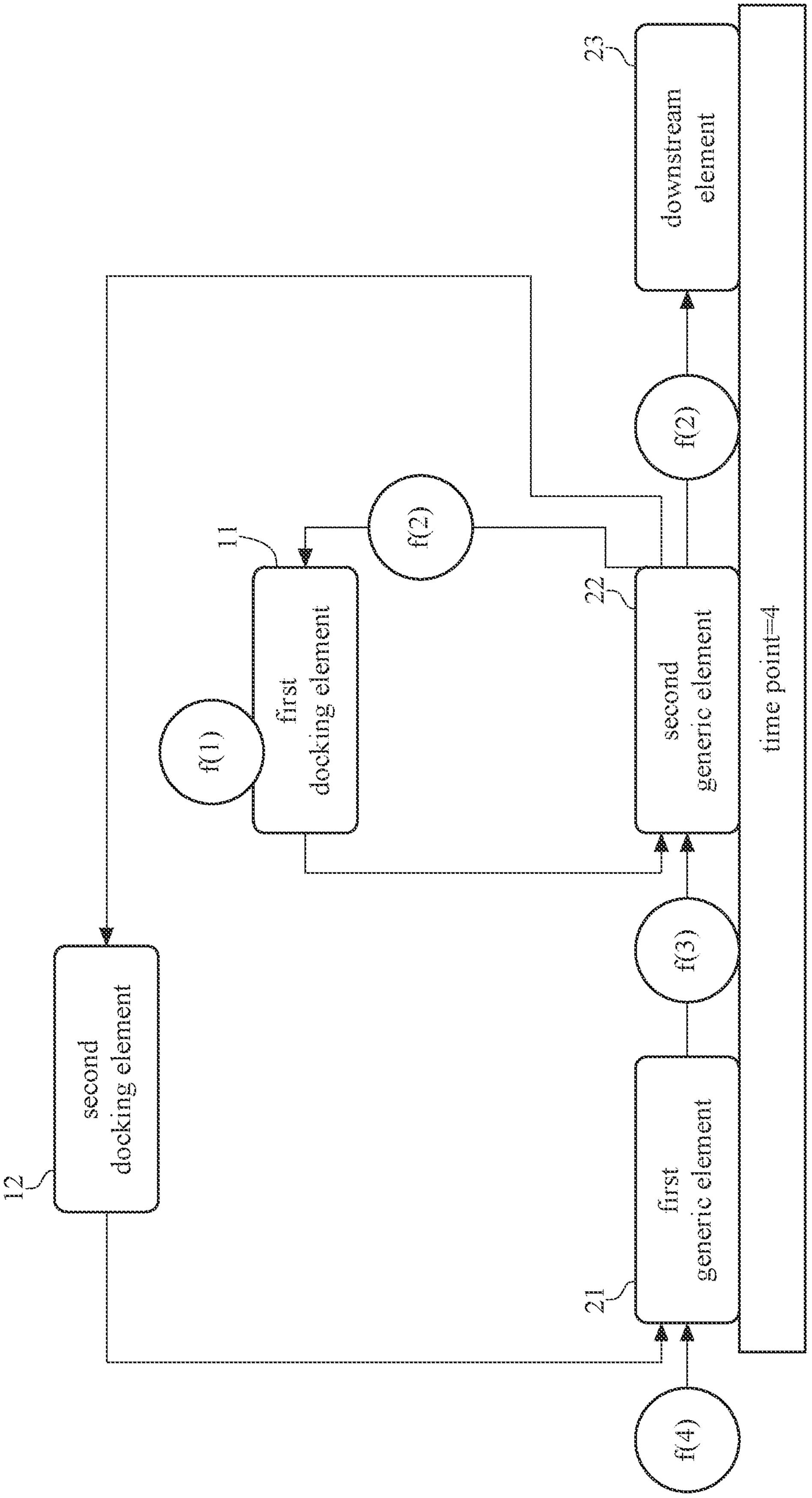
Figure 9E:
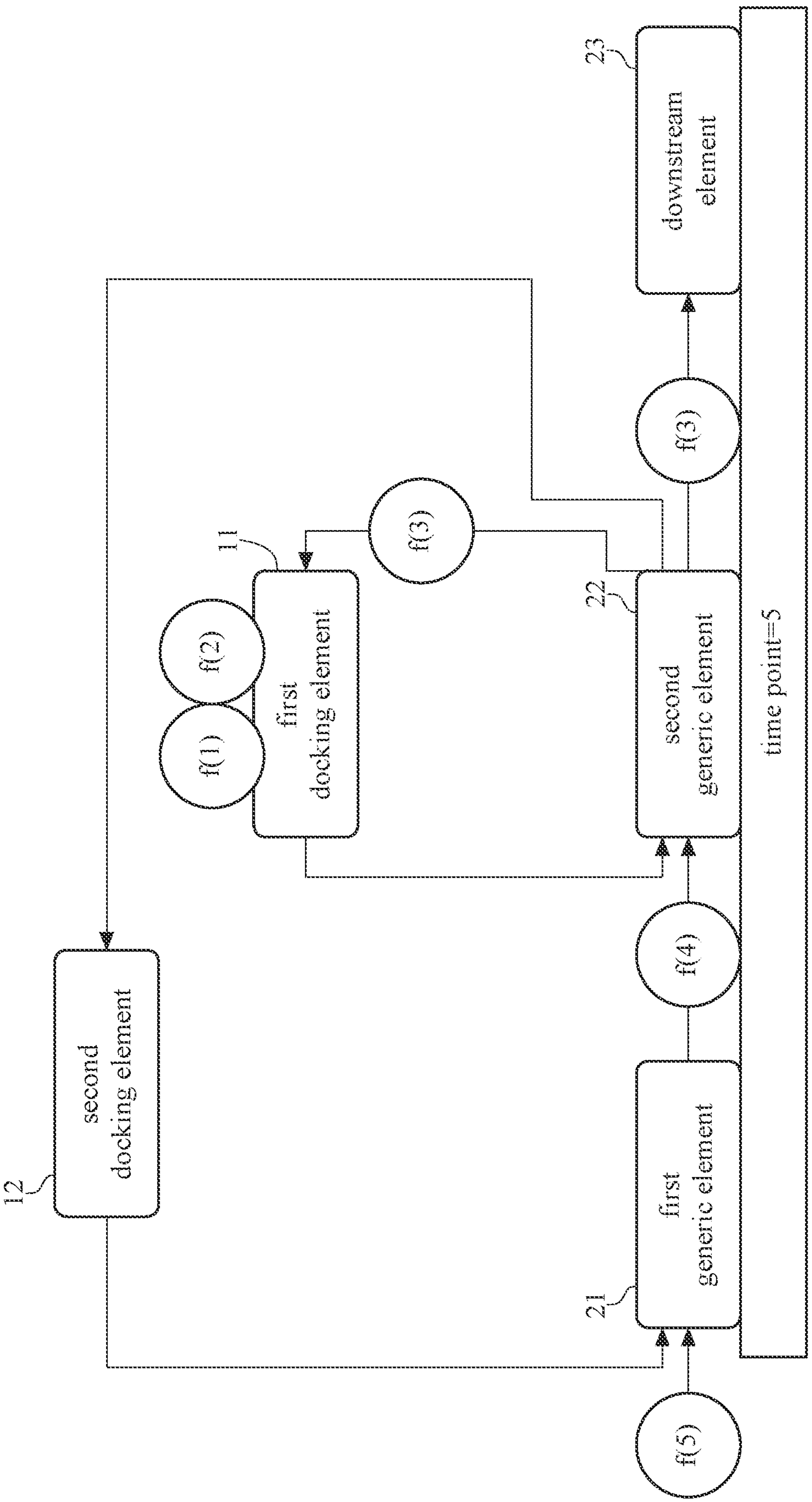
Figure 9F:
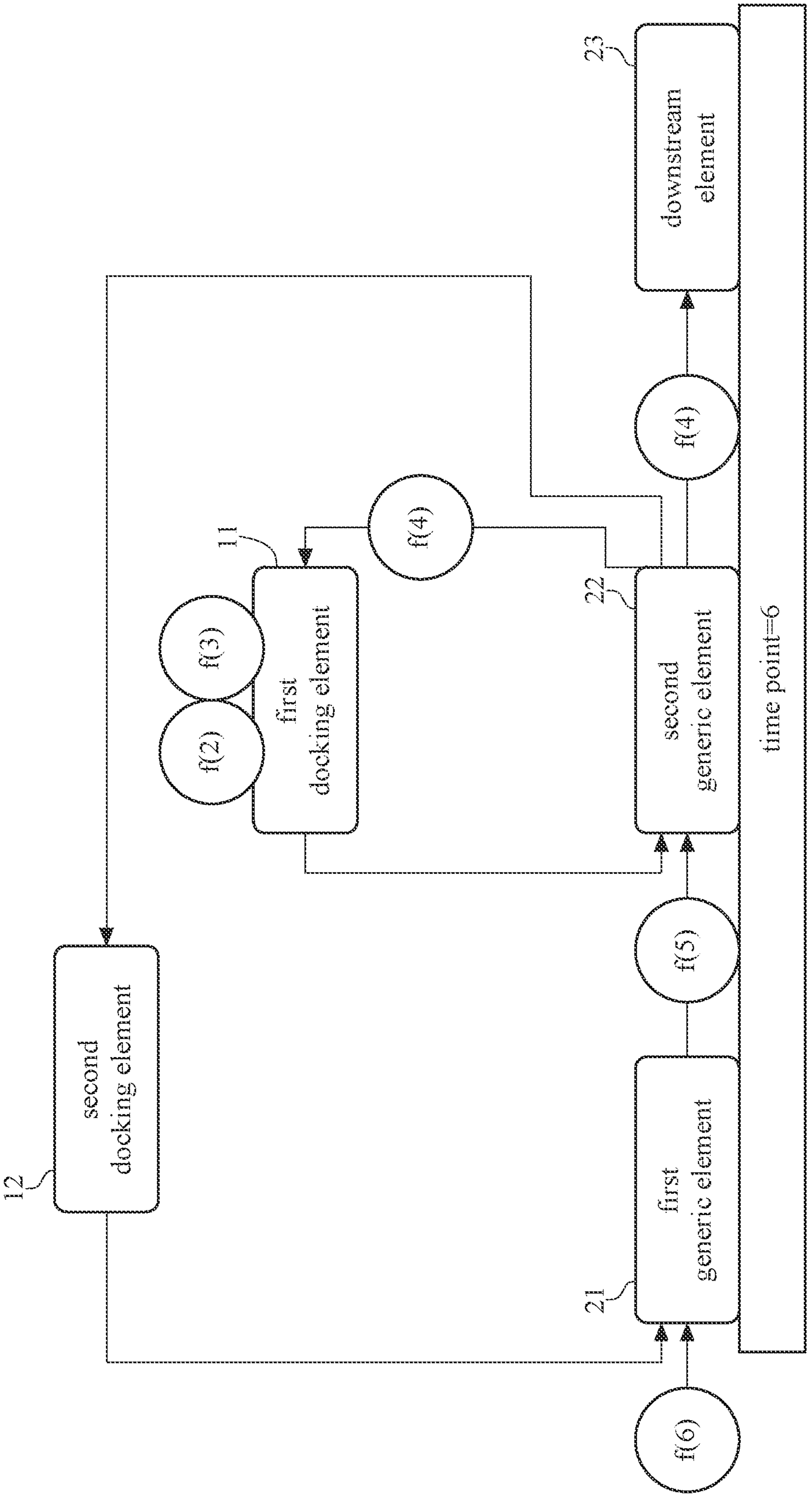
Figure 9G:
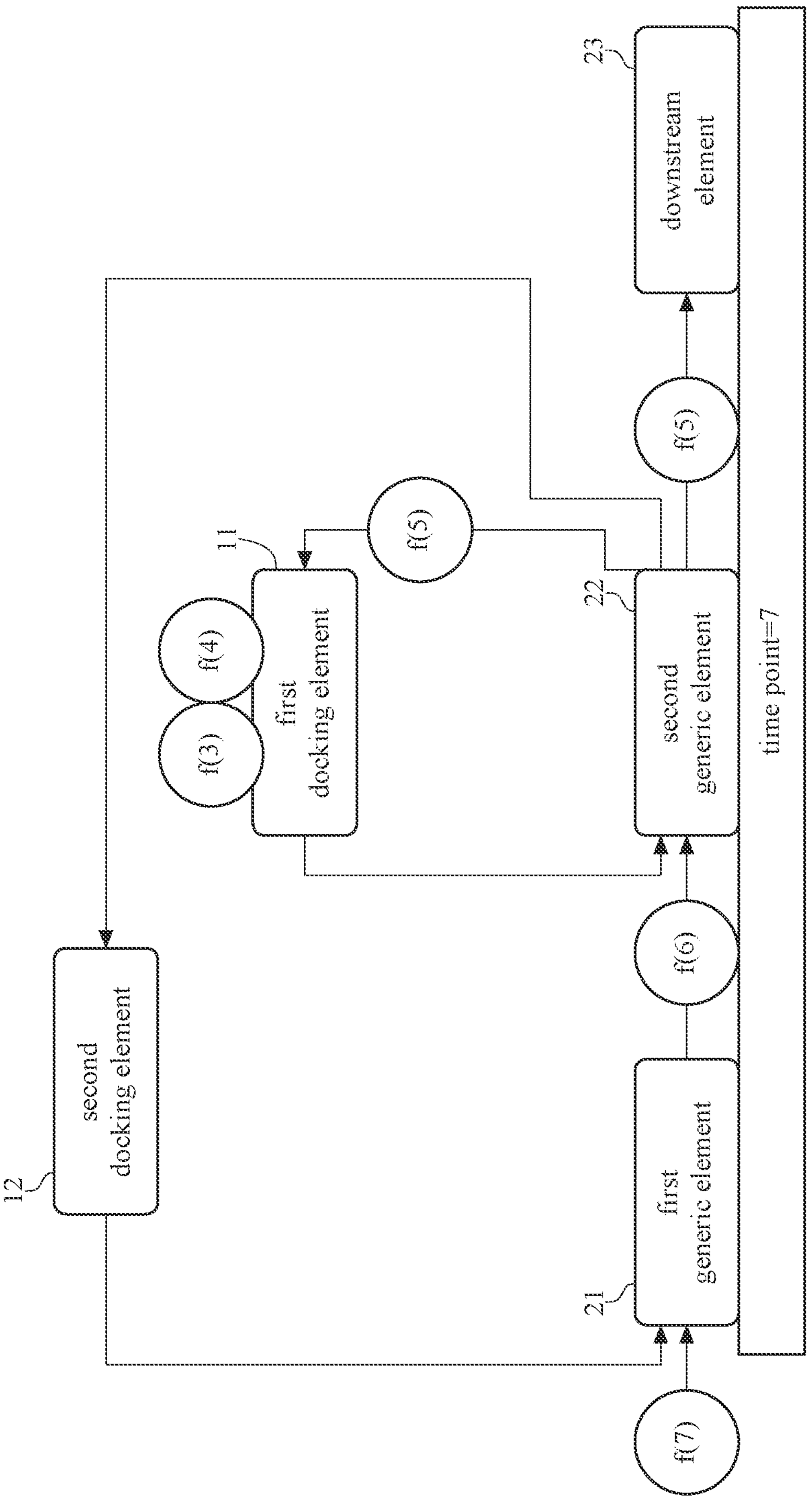
Figure 9H:
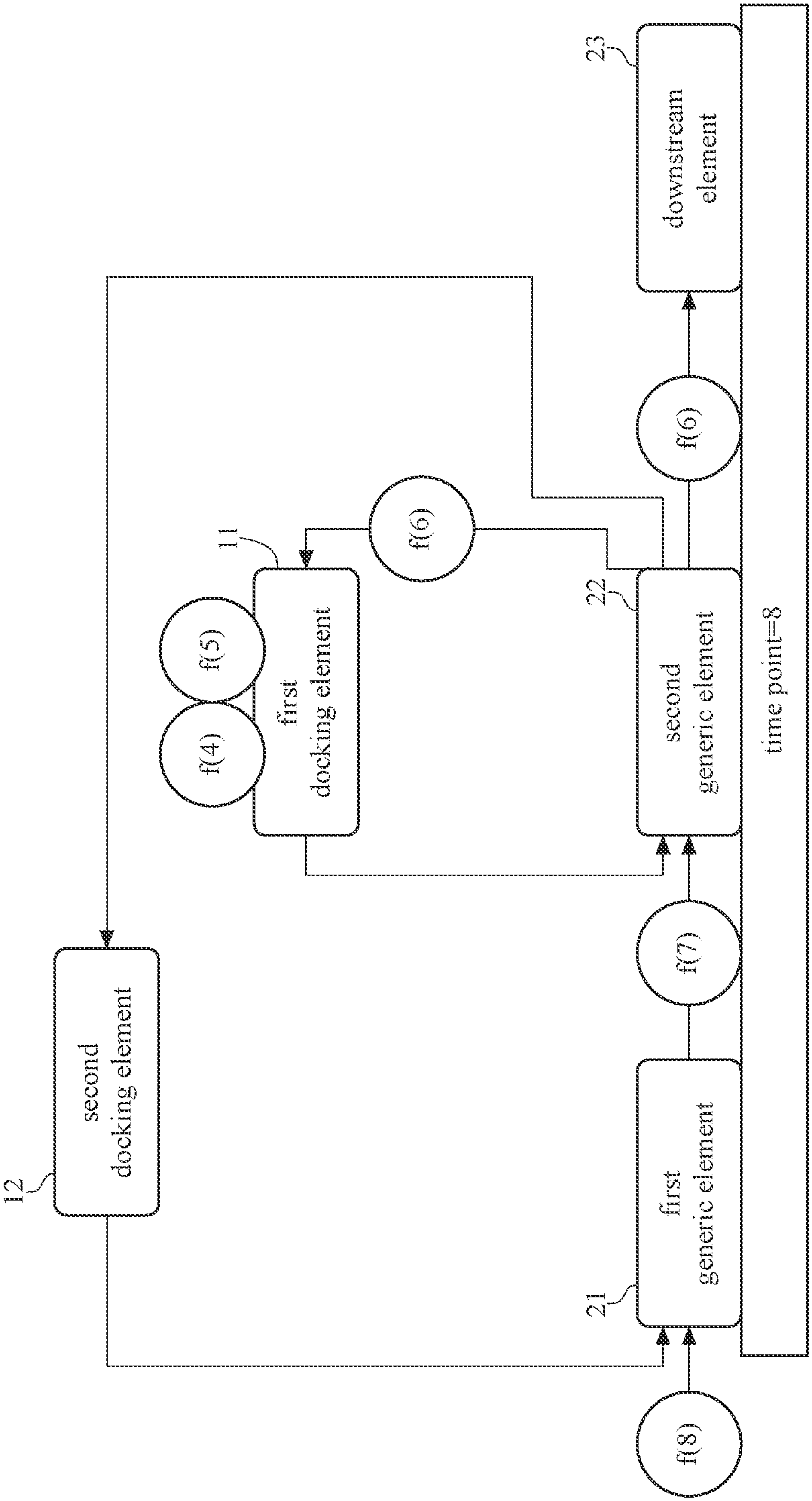

Please refer to FIG. 7 and FIG. 8, wherein FIG. 8 is a detailed structure of pipeline elements according to another embodiment of the present application. The data exchanging method of pipeline elements of the present disclosure may include defining a source pad 11*a* and a sink pad 11*b* on the first docking element 11; defining a source pad 12*a* and a sink pad 12*b* on the second docking element 12; defining sink pads 21*a* and 21*c* and source pads 21*b* and 21*d* on the first generic element 21; defining sink pads 22*a* and 22*c* and source pads 22*b* and 22*d* on the second generic element 22; connecting the sink pad 21*a* of the first generic element 21 to the source pad 12*a* of the second docking element 12; connecting the source pad 21*d* of the first generic element 21 to the sink pad 22*c* of the second generic element 22; connecting the sink pad 22*a* of the second generic element 22 to the source pad 11*a* of the first docking element 11; connecting the source pad 22*b* of the second generic element 22 to the sink pad 11*b* of the first docking element 11 and the sink pad 12*b* of the second docking element 12.

The second generic element 22 receives the first raw data from the first generic element 21, and the first generic element 21 receives the second feedback data from the second docking element 12. The implementation of step S105 of FIG. 2 may include the second generic element 22 processing the second raw data according to the intermediate data output by the first generic element 21, wherein the intermediate data is generated by the first generic element 21 processing the second feedback data.

To explain the operation of the pipeline elements of FIG. 7 and FIG. 8 in more details, please refer to FIG. 9(*a*) to FIG. 9(*h*), wherein FIG. 9(*a*) to FIG. 9(*h*) are schematic diagrams illustrating operation of performing image analysis and camera control by using pipeline elements of FIG. 7. FIG. 9(*a*) to FIG. 9(*h*) correspond to a first time point to an eighth time point, respectively. In FIG. 9(*a*) to FIG. 9(*h*), the data stream is a series of consecutive images, and raw data is an image frame. In FIG. 9(*a*) to FIG. 9(*h*), the pipeline elements further include a downstream element 23 connected to the second generic element 22. The first generic element 21 is configured to control a camera, the second generic element 22 is configured to execute the object tracking algorithm, the first docking element 11 is configured to execute the optical flow algorithm, and the second docking element 12 is configured to calculate a control parameter of the camera.

At the first time point in FIG. 9(*a*), the first generic element 21 receives the first raw data f(1). The first generic element 21 has not yet received the control parameter from the second docking element 12 and does not process the first raw data f(1). The first generic element 21 transmits the first raw data f(1) to the second generic element 22.

At the second time point in FIG. 9(*b*), the first generic element 21 receives the second raw data f(2). The first generic element 21 has not yet received the control parameter from the second docking element 12 and does not process the second raw data f(2). The first generic element 21 transmits the second raw data f(2) to the second generic element 22. The first raw data f(1) arrives at the second generic element 22. Since the second generic element 22 has not yet received the result of the optical flow algorithm of the first docking element 11, the second generic element 22 does not process the first raw data f(1) and transmits the first raw data f(1) to the first docking element 11 and the downstream element 23 for subsequent processing.

At the third time point in FIG. 9(*c*), the first generic element 21 receives third raw data f(3). The first generic element 21 has not yet received the control parameter from the second docking element 12 and does not process the third raw data f(3). The first generic element 21 transmits the third raw data f(3) to the second generic element 22. The second raw data f(2) arrives at the second generic element 22. Since the second generic element 22 has not yet received the result of the optical flow algorithm of the first docking element 11, the second generic element 22 does not process the second raw data f(2), and the second generic element 22 transmits the second raw data f(2) to the first docking element 11 and the downstream element 23 for subsequent processing.

At the fourth time point in FIG. 9(*d*), the first generic element 21 receives fourth raw data f(4). The first generic element 21 has not yet received the control parameter from the second docking element 12 and does not process the fourth raw data f(4). The first generic element 21 transmits the fourth raw data f(4) to the second generic element 22. The third raw data f(3) arrives at the second generic element 22. Since the second generic element 22 has not yet received the result of the optical flow algorithm of the first docking element 11, the second generic element 22 does not process the third raw data f(3), and the second generic element 22 transmits the third raw data f(3) to the first docking element 11 and the downstream element 23 for subsequent processing. At this time, the first raw data f(1) and the second raw data f(2) are stored in the buffer of the first docking element 11.

At the fifth time point in FIG. 9(*e*), the first generic element 21 receives fifth raw data f(5). The first generic element 21 has not yet received the control parameter from the second docking element 12 and does not process the fifth raw data f(5). The first generic element 21 transmits the fifth raw data f(5) to the second generic element 22. The fourth raw data f(4) arrives at the second generic element 22. Since the second generic element 22 has not yet received the result of the optical flow algorithm of the first docking element 11, the second generic element 22 does not process the fourth raw data f(4). The second generic element 22 transmits the fourth raw data f(4) to the first docking element 11 and the downstream element 23 for subsequent processing. At this time, the first raw data f(1), the second raw data f(2) and the third raw data f(3) are stored in the buffer of the first docking element 11. The first docking element 11 uses the first raw data f(1) and the second raw data f(2) to calculate the displacement vector of optical flow of the current image to obtain the movement trajectory of each feature point, and transmits the displacement vector to the second generic element 22. After the calculation of the displacement vector is complete, the first docking element 11 may remove the first raw data f(1) from the buffer.

At the sixth time point in FIG. 9(*f*), the first generic element 21 receives a sixth raw data f(6). The first generic element 21 has not yet received the control parameter from the second docking element 12 and does not process the sixth raw data f(6). The first generic element 21 transmits the sixth raw data f(6) to the second generic element 22. The second generic element 22 receives the result of the optical flow algorithm of the first docking element 11 and does not process the fifth raw data f(5). The second generic element 22 transmits the fifth raw data f(5) to the first docking element 11 and the downstream element 23 for subsequent processing. At this time, the buffer of the first docking element 11 stores the second raw data f(2), the third raw data f(3) and the fourth raw data f(4). The first docking element 11 uses the second raw data f(2) and the third raw data f(3) to calculate the displacement vector of optical flow of the current image to obtain the movement trajectory of each feature point, and transmits the displacement vector to the second generic element 22. The second generic element 22 may further analyze a movement direction of the object and output the movement direction to the second docking element 12. After the calculation of the displacement vector is complete, the first docking element 11 may remove the second raw data f(2) from the buffer.

At the seventh time point in FIG. 9(*g*), the first generic element 21 receives seventh raw data f(7). The first generic element 21 has not yet received the control parameter from the second docking element 12 and does not process the seventh raw data f(7). The first generic element 21 transmits the seventh raw data f(7) to the second generic element 22. The second generic element 22 receives the result of the optical flow algorithm of the first docking element 11 and does not process the sixth raw data f(6). The second generic element 22 transmits the sixth raw data f(6) to the first docking element 11 and the downstream element 23 for subsequent processing. At this time, the buffer of the first docking element 11 stores the third raw data f(3), the fourth raw data f(4) and the fifth raw data f(5). The first docking element 11 uses the third raw data f(3) and the fourth raw data f(4) to calculate the displacement vector of optical flow of the current image to obtain the movement trajectory of each feature point, and transmits the displacement vector to the second generic element 22. The second generic element 22 may further analyze a movement direction of the object and output the movement direction to the second docking element 12. The second docking element 12 determines that the filming angle of the camera should be adjusted according to the movement direction, and generates a control parameter for controlling the filming angle of the camera accordingly. The control parameter may include at least one of a pan parameter, a tilt parameter, a zoom parameter and an analog control parameter. After the calculation of the displacement vector is complete, the first docking element 11 may remove the third raw data f(3) from the buffer.

At the eighth time point in FIG. 9(*h*), the first generic element 21 receives eighth raw data f(8). Since the first generic element 21 receives the control parameter from the second docking element 12, the first generic element 21 adjusts the filming angle of the camera according to the control parameter. The first generic element 21 does not process the eighth raw data f(8) and transmits the eighth raw data f(8) to the second generic element 22. The second generic element 22 receives the result of the optical flow algorithm of the first docking element 11 and does not process the seventh raw data f(7). The second generic element 22 transmits the seventh raw data f(7) to the first docking element 11 and the downstream element 23 for subsequent processing. At this time, the buffer of the first docking element 11 stores the fourth raw data f(4), the fifth raw data f(5) and the sixth raw data f(6). The first docking element 11 uses the fourth raw data f(4) and the fifth raw data f(5) to calculate the displacement vector of optical flow of the current image to obtain the movement trajectory of each feature point, and transmits the displacement vector to the second generic element 22. The second generic element 22 may further analyze a movement direction of the object and output the movement direction to the second docking element 12. After the calculation of the displacement vector is complete, the first docking element 11 may remove the fourth raw data f(4) from the buffer.

In addition, in the embodiments of FIG. 7, FIG. 8 and FIG. 9(*a*) to FIG. 9(*h*), the first generic element 21 may also be omitted, the second generic element 22 may directly receive the data stream, and the second feedback data generated by the second docking element 12 may be output to another pipeline or an external device (for example, a controller of the camera) etc. through the source pad 12*a*.

A part of the steps or all of the steps of the method described in the above embodiments may be implemented by a computer program, such as random combination of an application, a driving program, an operating system etc. A person having ordinary skill in the art can write the methods of the above embodiments of the present disclosure into computer code and used as a computer program product, which will not be described for the sake of brevity. The computer code/computer program product implemented according to the method of the above-mentioned embodiments of the present disclosure may be stored in an appropriate non-transitory computer readable storage medium, such as DVD, CD-ROM, U disk, hard disk, or may also be disposed in an internet server that is accessible through internet (for example, Internet or other appropriate medium). In an embodiment, the non-transitory computer readable storage medium stores the computer code/computer program product of the embodiments described above, a computer executes the data exchanging method of pipeline elements when said computer code/computer program product is read by the computer.

In view of the above description, the data exchanging method of pipeline elements and non-transitory computer readable medium according to one or more embodiments of the present disclosure may allow elements in a pipeline to perform data exchange dynamically, data in a data stream may have high reusability, and associated parameter may be adjusted online without restarting the pipeline. With a docking element, other data processing may be simultaneously performed, and another pipeline may also be executed in the docking element. Therefore, the pipeline may have wider applications. Further, data exchange or control may be performed between elements in a pipeline or between an element in one pipeline and an external element. Therefore the docking element may transmit data within the pipeline to external element/device, thereby improving data transparency. Further, since data log or debug system of pipeline-based multimedia framework may store a large amount of data, by directly reading data from an element through the docking element, the generated message may be simpler and more concise, and the determination of whether the pipeline is abnormal may be performed more easily.

What is claimed is:

1. A data exchanging method of pipeline elements, adapted to a pipeline processing a data stream, comprising:

processing, by a generic element in the pipeline, first raw data in the data stream to generate first analysis data;

receiving and processing, by a first docking element, the first analysis data to generate first feedback data; and receiving, by the generic element, data associated with the first feedback data and processing, by the generic element, second raw data in the data stream according to the data associated with the first feedback data.

2. The data exchanging method of pipeline elements according to claim 1, wherein receiving, by the generic element, the data associated with the first feedback data comprises:

receiving, by the generic element, the first feedback data directly from the first docking element.

3. The data exchanging method of pipeline elements according to claim 1, wherein the generic element is a second generic element connected to a first generic element, and receiving, by the generic element, the data associated with the first feedback data and processing, by the generic element, the second raw data in the data stream according to the data associated with the first feedback data comprises:

processing, by the second generic element, the second raw data according to intermediate data from the first generic element, wherein the intermediate data is generated by the first generic element processing the first feedback data.

4. The data exchanging method of pipeline elements according to claim 1, further comprising:

receiving and processing, by a second docking element, the first analysis data to generate second feedback data.

5. The data exchanging method of pipeline elements according to claim 4, wherein the generic element is a second generic element connected to a first generic element, the first generic element receives the second feedback data from the second docking element, the second generic element receives the first raw data from the first generic element, and receiving, by the second generic element, the data associated with the first feedback data and processing, by the second generic element, the second raw data in the data stream according to the data associated with the first feedback data comprises:

processing, by the second generic element, the second raw data according to intermediate data from the first generic element, wherein the intermediate data is generated by the first generic element processing the second feedback data.

6. The data exchanging method of pipeline elements according to claim 1, further comprising:

defining a sink pad and a source pad of each of the generic element and the first docking element, respectively; and connecting the sink pad of the generic element to the source pad of the first docking element, and connecting the source pad of the generic element to the sink pad of the first docking element.

7. The data exchanging method of pipeline elements according to claim 4, further comprising:

defining a sink pad and a source pad of each of the generic element, the first docking element and the second docking element, respectively; and connecting the sink pad of the generic element to the source pad of the first docking element, and connecting the source pad of the generic element to the sink pad of the first docking element and the sink pad of the second docking element.

8. The data exchanging method of pipeline elements according to claim 5, further comprising:

defining a sink pad and a source pad of each of the first generic element, the second generic element, the first docking element the second docking element, respectively;

connecting the sink pad of the first generic element to the source pad of the second docking element;

connecting the sink pad of the second generic element to the source pad of the first docking element; and connecting the source pad of the second generic element to the sink pad of the first docking element and the sink pad of the second docking element.

9. The data exchanging method of pipeline elements according to claim 1, wherein receiving and processing, by the first docking element, the first analysis data to generate the first feedback data comprises:

storing, by the first docking element, the first raw data and the second raw data; and processing, by the first docking element, the first raw data and the second raw data to generate the first feedback data.

10. The data exchanging method of pipeline elements according to claim 1, wherein receiving and processing, by the first docking element, the first analysis data to generate the first feedback data comprises:

receiving, by the first docking element, a user command; and processing, by the first docking element, the first analysis data according to the user command to generate the first feedback data.

11. A non-transitory computer readable medium storing one or more computer-executable instructions which when executed by a computer result in performing the data exchanging method of pipeline elements according to claim 1.

12. A non-transitory computer readable medium storing one or more computer-executable instructions which when executed by a computer result in performing the data exchanging method of pipeline elements according to claim 2.

13. A non-transitory computer readable medium storing one or more computer-executable instructions which when executed by a computer result in performing the data exchanging method of pipeline elements according to claim 3.

14. A non-transitory computer readable medium storing one or more computer-executable instructions which when executed by a computer result in performing the data exchanging method of pipeline elements according to claim 4.

15. A non-transitory computer readable medium storing one or more computer-executable instructions which when executed by a computer result in performing the data exchanging method of pipeline elements according to claim 5.

16. A non-transitory computer readable medium storing one or more computer-executable instructions which when executed by a computer result in performing the data exchanging method of pipeline elements according to claim 6.

17. A non-transitory computer readable medium storing one or more computer-executable instructions which when executed by a computer result in performing the data exchanging method of pipeline elements according to claim 7.

18. A non-transitory computer readable medium storing one or more computer-executable instructions which when executed by a computer result in performing the data exchanging method of pipeline elements according to claim 8.

19. A non-transitory computer readable medium storing one or more computer-executable instructions which when executed by a computer result in performing the data exchanging method of pipeline elements according to claim 9.

20. A non-transitory computer readable medium storing one or more computer-executable instructions which when executed by a computer result in performing the data exchanging method of pipeline elements according to claim 10.

* * * * *